United States Patent [19]

Furletti

[11] Patent Number: 4,773,318
[45] Date of Patent: Sep. 27, 1988

[54] OMELET PAN

[76] Inventor: Herman J. Furletti, 63-34 83rd Pl., Middle Village, N.Y. 11379

[21] Appl. No.: 122,704

[22] Filed: Nov. 19, 1987

[51] Int. Cl.⁴ ............................................. A47J 37/10
[52] U.S. Cl. ......................................... 99/424; 99/372
[58] Field of Search ............. 126/373, 390; 220/85 D; 99/352, 372, 422, 423, 424, 426

[56] References Cited

U.S. PATENT DOCUMENTS

| 316,741 | 4/1885 | Carpenter | 99/424 |
| 924,336 | 6/1909 | French | 99/424 |
| 933,545 | 9/1909 | French | 99/424 |
| 1,907,987 | 8/1914 | Nash | 99/424 |

Primary Examiner—Samuel Scott
Assistant Examiner—Noah Kamen
Attorney, Agent, or Firm—Howard M. Schwinger

[57] ABSTRACT

An omelet pan consisting of a pan having a handle, a spatula for the pan, the spatula normally resting in the pan and having a handle, the handle of the spatula being rotatably affixed to the handle of the pan so the spatula can be rotated with respect to the pan.

4 Claims, 2 Drawing Sheets

OMELET PAN

This invention relates to cookery and more particularly to a frying pan for making omelets.

Although heretofore there have been proposals for omelet pans having means for flipping the omelet, such have been deficient in one respect or another.

BRIEF SUMMARY OF THE INVENTION

It is therefore an important object of the present invention to provide an omelet pan having means for flipping the omelet during cooking.

It is another important object of the present invention to provide an omelet pan having such a flipper which is simple to use and inexpensive to manufacture.

Other objects and advantages of the present invention will become apparent from a reading of the following specification taken in connection with the accompanying drawing wherein:

These and other objects are accomplished by an omelet pan having a handle, a spatula for said pan, said spatula normally resting in the pan and having a handle, the handle of the spatula being rotatably affixed to the handle of the pan so the spatula can be rotated with respect to the pan.

DETAILED DESCRIPTION

Figure 1:
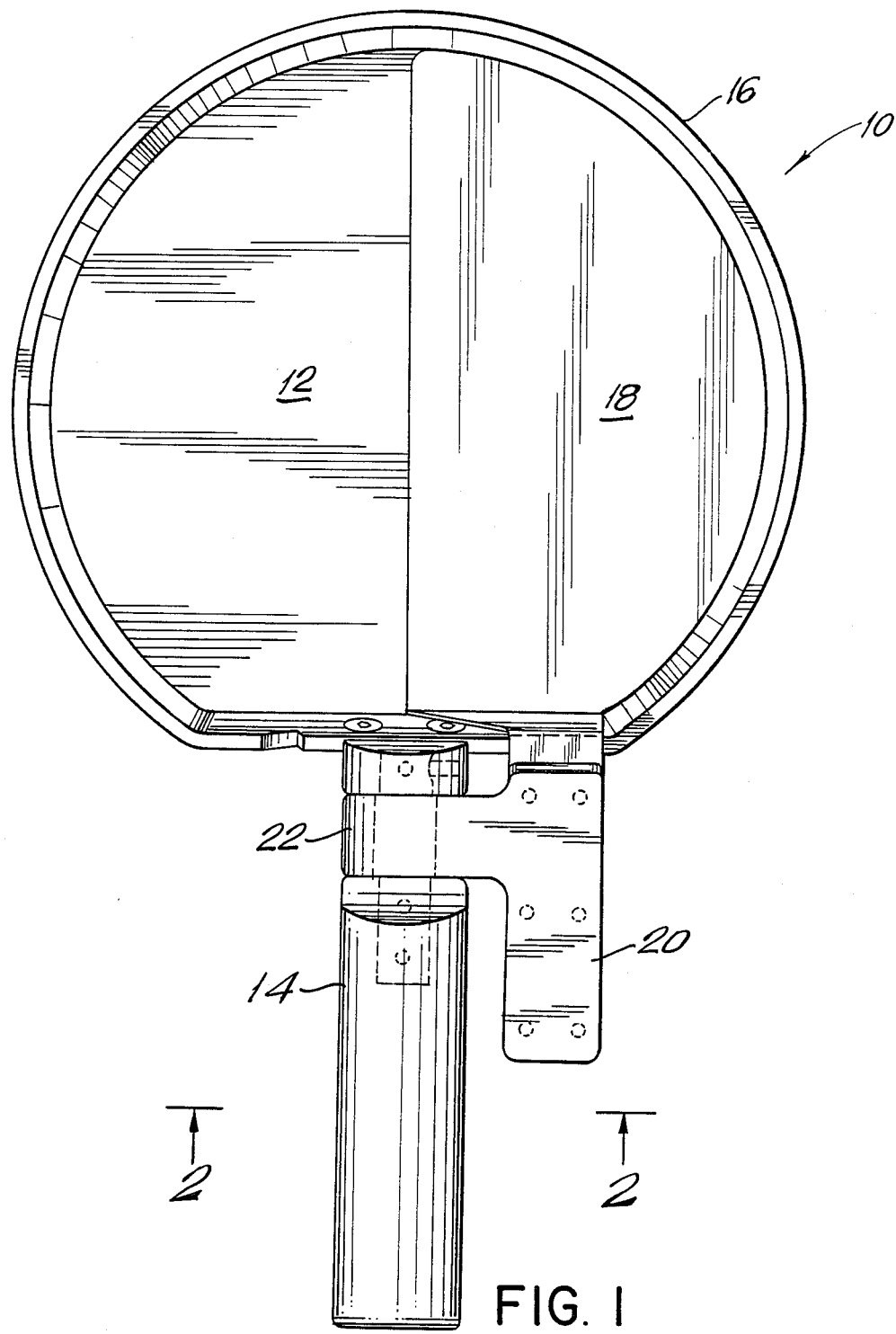
FIG. 1 is a plan view of an embodiment an omelet pan in accordance with the present invention with the spatula in the starting position.

Referring now to the drawing, a pan in accordance with the present invention, generally designated by numeral 10, is shown consisting of platter 12 and handle 14. The platter is provided with a retaining lip or wall 16 to confine contents within the pan.

A spatula 18 is provided for the pan, the spatula being shaped to approximate one half of the platter and is also provided with a handle 20.

The handle of the spatula is provided with a slotted extension 22 by means of which it may be affixed to the handle 14 of the pan. The pan end of the pan handle is recessed at 26 to receive the Slotted extension of the spatula.

Figure 2:
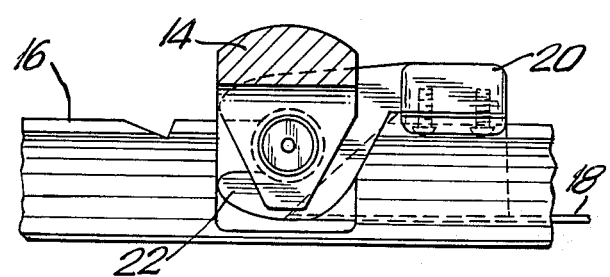
FIG. 2 is a sectional fragmentary view taken on line 2—2 of FIG. 1, in the direction of the arrows.
Figure 3:
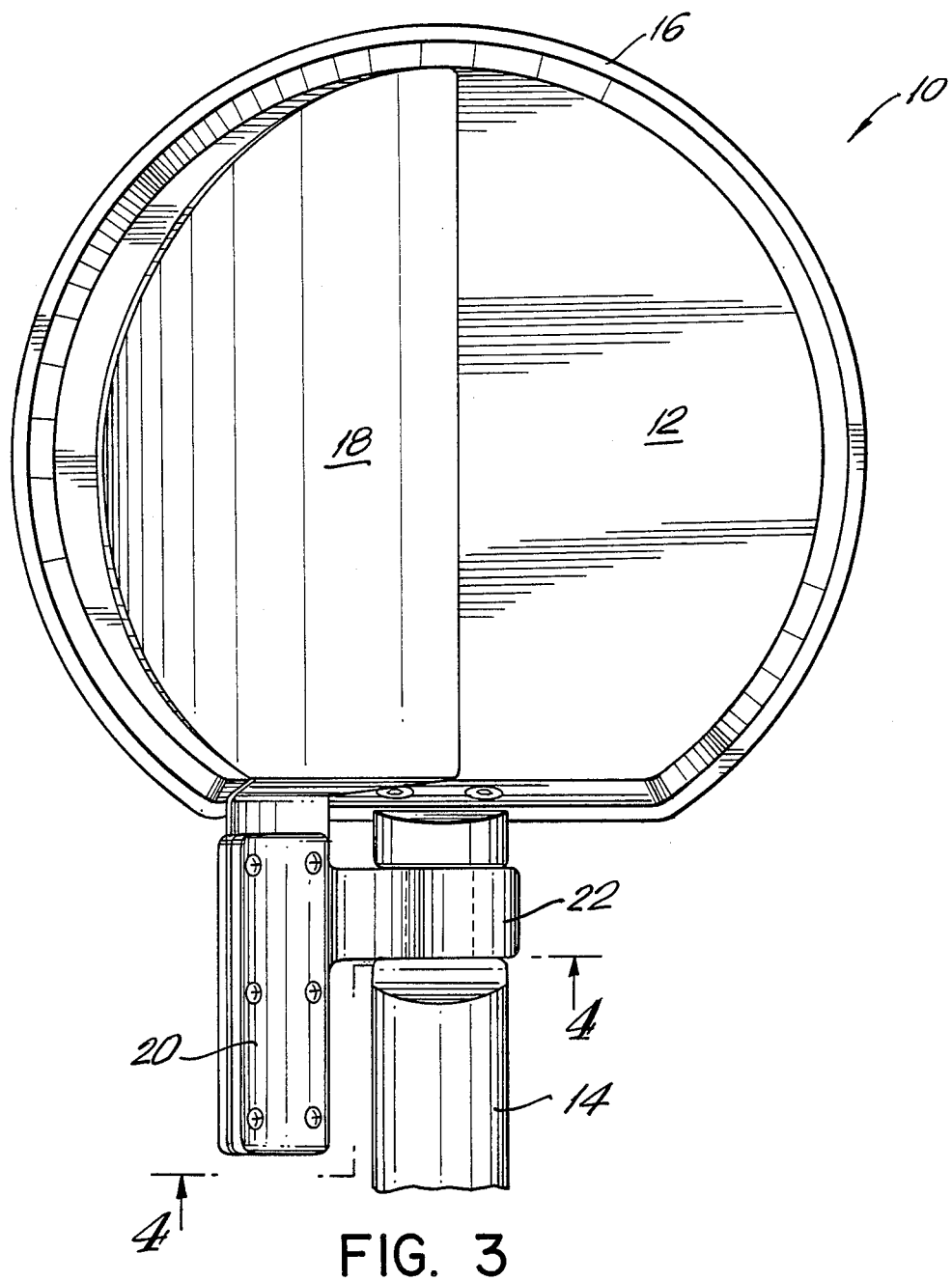
FIG. 3 is a plan view of the embodiment of FIG. 1 showing the spatula in the finishing position.
Figure 4:
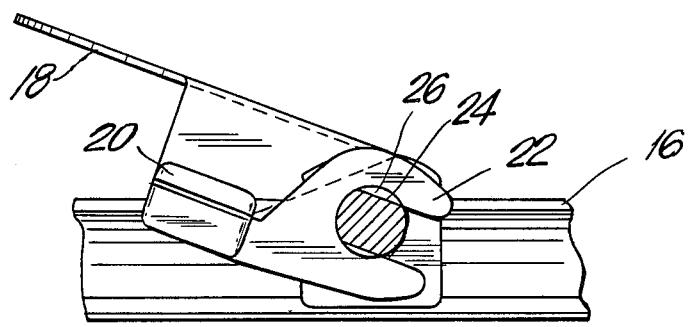
FIG. 4 is a sectional fragmentary view taken on line 4—4 of FIG. 3, in the direction of the arrows.

The slotted extension of the spatula is adapted to rotate about the pan handle, the respective parts being shaped so that the spatula is only releasable from the pan handle after being rotated approximately 180 degrees thereabout. This is because opposing portions of the pan handle have been flattened as at 24 to register with the flattened ends of extension 22 when fully rotated, the said parts thus acting as cam and cam follower, respectively (See FIGS. 2 and 4 in this connection).

In actual use when it is desired to turn the omelet the spatula is simply rotated by rotating its handle about the pan handle thus turning the omelet. The spatula may be released from the pan after it has traveled approximately 180 degrees and the omelet has been turned.

It should be realized that the embodiment herein described is only representative of the invention and it is not intended to limit the invention to this particular embodiment as the invention encompasses all embodiments falling with the spirit and scope of the appended claims.

I claim:

1. An omelet pan comprising a pan and spatula both having handles, said spatula being seated in said pan, said handles extending from the pan in close proximity to each other, a bracket extending from the handle of the spatula, said bracket being rotatably mounted on the pan handle, the spatula being removable from the pan during cooking.

2. An omelet pan comprising a pan having a handle, a spatula provided with a handle seated in said pan, said handles extending from the pan in close proximity to each other, a bracket extending from the spatula to the handle of the pan, said bracket being slotted to receive the pan handle, the spatula being rotatable on the pan handle and removable from the pan during cooking.

3. An omelet pan comprising a pan having a handle, a spatula provided with a handle seated in said pan, the blade of said spatula being about one half of the size of the pan bottom and following its configuration, said handles extending from the pan in close proximity to each other, a bracket extending from the handle of the spatula to the handle of the pan, said bracket being slotted to receive the pan handle, the spatula being rotatable on the pan handle and removable from the pan during cooking.

4. An omelet pan comprising a pan having a handle, a spatula provided with a handle seated in said pan, the blade of said spatula being about one half of the size of the pan bottom and following its configuration, said handles extending from the pan in close proximity to each other, a bracket extending from the handle of the spatula to the handle of the pan, said bracket being slotted to receive the pan handle, the spatula being rotatable on the pan handle and removable from the pan during cooking, the pan handle and the slot formed in the bracket being shaped so that the spatula is released from the pan handle only upon being rotated approximately 180 degrees with respect thereto.

* * * * *